J. W. THOMPSON.
SULFIDATION AND FLOTATION OF ORES.
APPLICATION FILED NOV. 16, 1916.
1,334,721.
Patented Mar. 23, 1920.
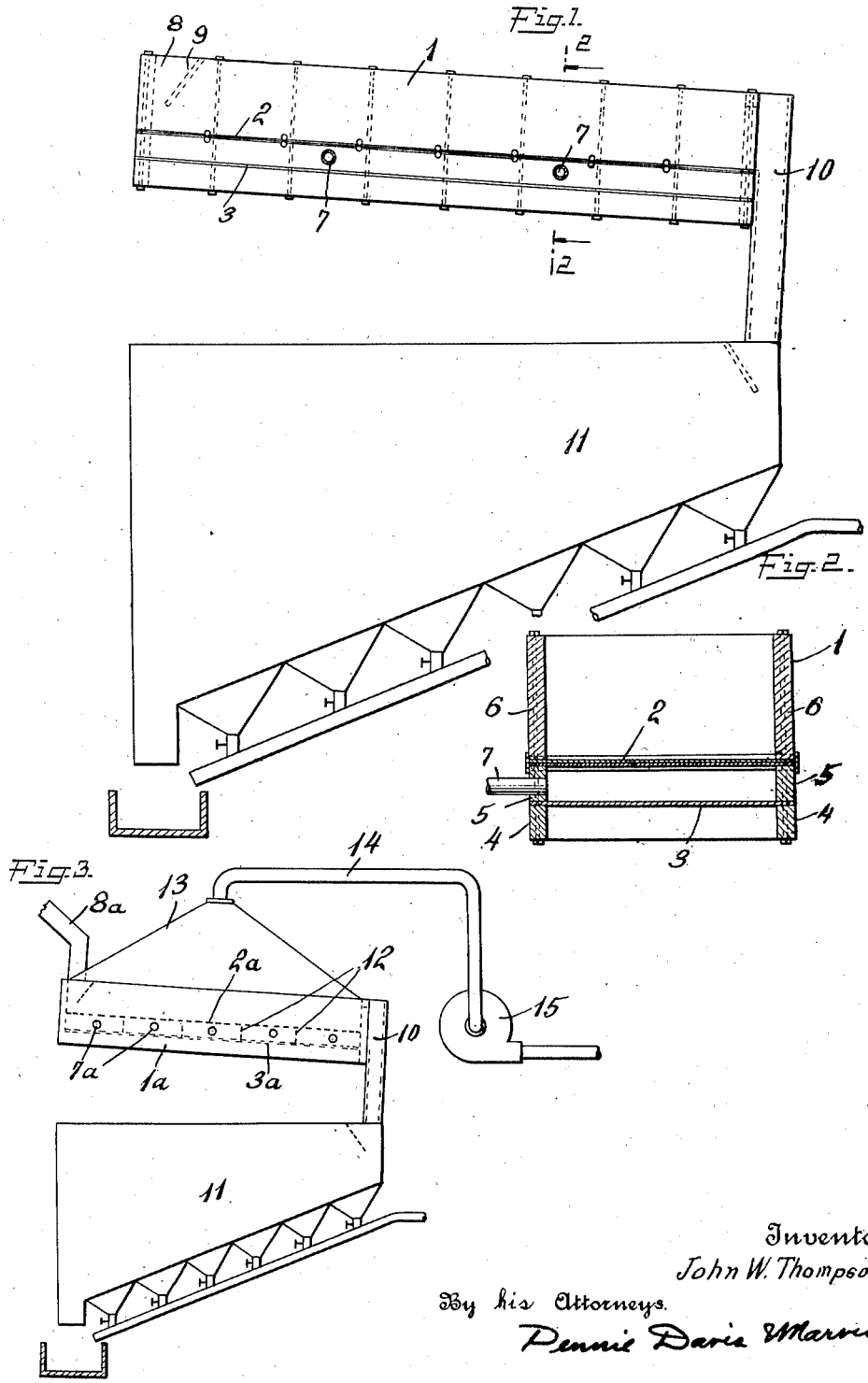
Inventor
John W. Thompson.
By his Attorneys.
Pennie Davis Marvin

UNITED STATES PATENT OFFICE.

JOHN W. THOMPSON, OF SUPERIOR, ARIZONA, ASSIGNOR TO METALS RECOVERY COMPANY, OF NEW YORK, N. Y., A CORPORATION OF MAINE.

SULFIDATION AND FLOTATION OF ORES.

1,334,721.   Specification of Letters Patent.   Patented Mar. 23, 1920.

Application filed November 16, 1916. Serial No. 131,688.

*To all whom it may concern:*

Be it known that I, JOHN W. THOMPSON, a citizen of the United States, residing at Superior, Pinal county, State of Arizona, have invented certain new and useful Improvements in Sulfidation and Flotation of Ores; and I do hereby declare the following to be a full, clear, and exact description of the invention, such as will enable others skilled in the art to which it appertains to make and use the same.

In the sulfidation of oxidized ores, or of ores containing oxidized constituents, the ore is subjected to a sulfidizing operation such as a treatment with hydrogen sulfid gas or its equivalent. In such a sulfidizing operation, the oxidized ore constituents may be merely filmed with the sulfid or they may be converted to a greater or less extent into the sulfid. Such sulfidizing operations can be carried out in apparatus of various kinds, wherein the necessary intermixture of the hydrogen sulfid gas and the ore pulp is effected. Thus the hydrogen sulfid may be injected into the ore pulp in a suitable tank, by introduction of the hydrogen sulfid at the bottom of the tank which may be provided with agitators; or the intermixture may be effected in a centrifugal pump or other appropriate apparatus. So also, the hydrogen sulfid may be introduced under ordinary atmospheric pressure or under a materially increased pressure.

The presence of any considerable excess of hydrogen sulfid seems to be prejudicial to the subsequent flotation. The present invention relates to a novel method and apparatus for effecting the removal of this excess hydrogen sulfid and other similar interfering gases, whereby the subsequent flotation operation is promoted.

The invention will be further described in connection with the accompanying drawing illustrative thereof in which—

Figure 1 shows an apparatus embodying the invention, in elevation;

Fig. 2 is a section taken on the line 2, 2 of Fig. 1; and

Fig. 3 is a diagrammatic illustration of a modified embodiment of the invention.

As shown in Figs. 1 and 2, the apparatus comprises a trough or launder 1, the bottom of which is covered with canvas or other porous material 2, through which air may be blown. Below this porous bottom 2 is another bottom 3, spaced apart therefrom to form a compressed air compartment to which the compressed air is supplied by the pipes 7. The trough is shown as made up of the side members 4, 5 and 6, between which the bottoms 2 and 3 are held.

The ore pulp enters at 8, a baffle 9 being provided to assist in breaking up the entering stream. The pulp leaves the trough at 10 and is discharged into a flotation cell 11 shown in outline as a cell of the type known as the Callow cell, in which the flotation is effected by air introduced through a porous bottom.

In the operation of this apparatus, the pulp passes through the trough above the porous bottom and air is forced through this bottom and through the pulp, thereby aerating the pulp and removing from it the excess hydrogen sulfid or other interfering gases which may be present. It is not intended that any appreciable froth formation shall take place in the trough 1, although such formation may take place to a greater or less extent; but this trough and the treatment of the pulp while passing through it are intended to remove from the pulp the excess hydrogen sulfid and similar gases and to preliminarily aerate the pulp so that its subsequent flotation may be correspondingly promoted.

The porous bottom 2 is shown as made up of two layers of canvas, but it will be evident that this porous bottom may be made of different materials which will permit the uniform discharge of air therethrough into the body of pulp. So also the canvas, when used, may be reinforced or held in place by any appropriate means.

The apparatus of Fig. 3 is provided with a hood 13 connected with an outlet pipe 14 leading to a suction fan 15 by means of which the apparatus may be subjected to a partial vacuum. By thus collecting and removing the air and gas from the trough 1ª contamination of the surrounding atmosphere is prevented and the removal of the hydrogen sulfid and similar gases is promoted by the action of the suction.

The compressed air is introduced into the apparatus of Fig. 3 through a plurality of compartments each provided with an inlet pipe 7ª. These compartments are formed by partitions 12 between the upper porous bottom 2ª and the lower imperforate bottom 3ª. The inlet pipe for the ore pulp is shown at 8ª and the outlet at 10.

Improvements in the flotation of ore pulps have been noted, by treatment of the pulps in the manner described above, even where no hydrogen sulfid was shown to be present by test with lead acetate. Accordingly, it seems probable that the improvement in the flotation of the pulp is due, in part at least, to the removal of other constituents than hydrogen sulfid, which are prejudicial to flotation, and which may be incidental to the sulfidation operation in which the hydrogen sulfid itself is used. Whatever the nature of the impurities removed, or whatever the explanation of the aerating action may be, the improvement due to this treatment has been found to be very pronounced, and the flotation operation correspondingly facilitated. Thus, in cases where very indifferent results had been previously obtained, materially improved results were obtained by treatment of the sulfidized pulp in the manner above described.

What I claim is:

1. The method of promoting the flotation of oxidized ores which have been sulfidized by the action of a soluble sulfid, which comprises subjecting the sulfidized ore after the sulfidizing operation to a preliminary aeration treatment before effecting the flotation; substantially as described.

2. The method of promoting the flotation of oxidized ores which have been sulfidized by the action of a soluble sulfid, which comprises subjecting the sulfidized ore after the sulfidizing operation to a preliminary aeration treatment and to a partial vacuum, before effecting the flotation; substantially as described.

3. The method of promoting the flotation of oxidized ores which have been sulfidized by the action of a soluble sulfid, which comprises flowing the sulfidized ore pulp after the sulfidizing operation over a layer of porous material before reaching the flotation machine, and blowing air through such porous material and the ore pulp thereon; substantially as described.

4. The method of promoting the flotation of oxidized ores which have been sulfidized by the action of a soluble sulfid and of removing therefrom gaseous constituents prejudicial to the flotation, which comprises blowing an air current through such sulfidized ore pulp after the sulfidizing operation, substantially as described.

5. The method of promoting the flotation of oxidized ores which have been sulfidized by the action of a soluble sulfid and of removing therefrom gaseous constituents prejudicial to the flotation, which comprises blowing an air current through such sulfidized ore pulp while maintained under a partial vacuum, substantially as described.

6. An apparatus for the treatment of oxidized ores which have been sulfidized preparatory to the concentration thereof by flotation comprising a preliminary ore treating cell, and means associated with said cell for subjecting sulfidized ore after the sulfidizing operation to a preliminary aeration and to a partial vacuum for removing prejudicial gaseous constituents before the flotation; substantially as described.

7. An apparatus for the treatment of oxidized ores which have been sulfidized preparatory to the concentration thereof by flotation comprising a preliminary ore treating cell provided with a porous bottom and with means for producing therein a partial vacuum for the preliminary treatment of oxidized ores which have been sulfidized, means for flowing the sulfidized ore pulp after the sulfidizing operation through said preliminary cell, and means for blowing air through the porous bottom of the preliminary cell and the ore pulp flowing therethrough; substantially as described.

In testimony whereof I affix my signature.

JOHN W. THOMPSON.